(12) United States Patent
Lee et al.

(10) Patent No.: US 12,560,939 B2
(45) Date of Patent: Feb. 24, 2026

(54) DRIVING ROBOT GENERATING DRIVING MAP AND CONTROLLING METHOD THEREOF

(71) Applicant: SAMSUNG ELECTRONICS CO., LTD., Suwon-si (KR)

(72) Inventors: Taeyoon Lee, Suwon-si (KR); Kuyoung Choi, Suwon-si (KR); Hyunjoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 18/232,595

(22) Filed: Aug. 10, 2023

(65) Prior Publication Data

US 2024/0094740 A1 Mar. 21, 2024

Related U.S. Application Data

(63) Continuation of application No. PCT/KR2023/010556, filed on Jul. 21, 2023.

(30) Foreign Application Priority Data

Sep. 15, 2022 (KR) ........................ 10-2022-0116603
Oct. 26, 2022 (KR) ........................ 10-2022-0139575

(51) Int. Cl.
G05D 1/00 (2006.01)
G06T 7/50 (2017.01)

(52) U.S. Cl.
CPC ......... G05D 1/0274 (2013.01); G05D 1/0246 (2013.01); G06T 7/50 (2017.01); G06T 2207/10028 (2013.01)

(58) Field of Classification Search
CPC .. G05D 1/0274; G05D 1/0246; G05D 1/2435; G05D 2105/28; G05D 1/246;
(Continued)

(56) References Cited

U.S. PATENT DOCUMENTS 8,023,727 B2 9/2011 Matsumoto et al.
8,705,842 B2 4/2014 Lee et al.
(Continued)

FOREIGN PATENT DOCUMENTS

CN 112270753 A 1/2021
CN 110163915 B 7/2021
(Continued)

OTHER PUBLICATIONS

International Search Report (PCT/ISA/210) issued Nov. 3, 2023 by the International Searching Authority in International Patent Application No. PCT/KR2023/010556.
(Continued)

*Primary Examiner* — Kito R Robinson
*Assistant Examiner* — Alexander V Gentile
(74) *Attorney, Agent, or Firm* — Sughrue Mion, PLLC

(57) ABSTRACT

A driving robot includes: a camera including a depth camera; and at least one processor configured to: control the camera to acquire depth data in one or more areas where the driving robot moves, identify, from the acquired depth data, a plurality of scan data sets corresponding to a plurality of predetermined height levels, identify, based on the plurality of scan data sets, a plurality of feature scores corresponding to the plurality of scan data sets, and generate at least one area map corresponding to at least one scan data set among the plurality of scan data sets, wherein a feature score, among the plurality of feature scores, corresponding to the at least one scan data set is greater than or equal to a predetermined critical value.

20 Claims, 10 Drawing Sheets

(58) Field of Classification Search

CPC .......... G05D 2107/60; G05D 2107/63; G05D 2111/10; G05D 1/242; G05D 1/243; G05D 2109/10; G06T 7/50; G06T 2207/10028; G01C 21/20; B25J 5/00; B25J 9/16; B25J 19/02; G06V 20/40

See application file for complete search history.

(56) References Cited

U.S. PATENT DOCUMENTS

| | | | |
|---|---|---|---|
| 9,058,521 | B2 | 6/2015 | Yoon et al. |
| 10,542,859 | B2 | 1/2020 | Lee et al. |
| 10,591,925 | B2 | 3/2020 | Kim |
| 11,449,061 | B2 * | 9/2022 | Ebrahimi Afrouzi ........................ A47L 11/4011 |
| 11,520,341 | B2 | 12/2022 | Watanabe |
| 2009/0226113 | A1 | 9/2009 | Matsumoto et al. |
| 2012/0106829 | A1 * | 5/2012 | Lee ...................... G05D 1/0274 382/153 |
| 2018/0113467 | A1 | 4/2018 | Kim |
| 2018/0210448 | A1 * | 7/2018 | Lee ...................... G05D 1/0214 |
| 2021/0089040 | A1 | 3/2021 | Ebrahimi Afrouzi et al. |
| 2021/0331754 | A1 | 10/2021 | Whitman |
| 2023/0213944 | A1 | 7/2023 | Baik et al. |
| 2025/0061599 | A1 * | 2/2025 | Sun ................... G01C 21/3833 |

FOREIGN PATENT DOCUMENTS

| | | | | | |
|---|---|---|---|---|---|
| EP | 3257420 | A1 * | 12/2017 | .............. | A47L 9/28 |
| JP | 2009-217363 | A | 9/2009 | | |
| JP | 2020-184148 | A | 11/2020 | | |
| KR | 10-2012-0047137 | A | 5/2012 | | |
| KR | 10-1739996 | B1 | 5/2017 | | |
| KR | 10-2017-0061373 | A | 6/2017 | | |
| KR | 10-2019-0020006 | A | 2/2019 | | |
| KR | 10-2242653 | B1 | 4/2021 | | |
| KR | 10-2022-0039101 | A | 3/2022 | | |
| KR | 10-2535719 | B1 | 5/2023 | | |
| WO | 2020/076418 | A1 | 4/2020 | | |
| WO | 2022059937 | A1 | 3/2022 | | |

OTHER PUBLICATIONS

Written Opinion (PCT/ISA/237) issued Nov. 3, 2023 by the International Searching Authority in International Patent Application No. PCT/KR2023/010556.

Communication dated Jun. 27, 2025, issued by the European Patent Office in European Application No. 23865705.0.

Wang et al., "Autonomous Mobile Robot Navigation in Uneven and Unstructured Indoor Environments", 2017 IEEE/RSJ International Conference on Intelligent Robots and Systems (IROS) Sep. 24, 2017, Vancouver, BC, Canada, pp. 109-116 , XP 033265917.

* cited by examiner

<u>100</u>

100

DRIVING ROBOT GENERATING DRIVING MAP AND CONTROLLING METHOD THEREOF

CROSS-REFERENCE TO RELATED APPLICATIONS

This application is a by-pass continuation of International Application No. PCT/KR2023/010556, filed on Jul. 21, 2023, which is based on and claims priority to Korean Patent Application No. 10-2022-0116603, filed Sep. 15, 2022, in the Korean Intellectual Property Office and Korean Patent Application No. 10-2022-0139575, filed Oct. 26, 2022, in the Korean Intellectual Property Office, the disclosures of which are incorporated by reference herein in their entireties.

BACKGROUND

1. Field

The disclosure relates to a driving robot generating a driving map and a controlling method thereof.

2. Description of the Related Art

Automation technologies using robots have been provided in various fields. In a factory, a robot is used to produce a product. A robot that cooks ordered food has also appeared, and a robot that serves food has also appeared.

The robot may receive an order from a user in a touch or voice manner, and cook food based on a set recipe. The robot may identify a user position and its surrounding environment, and autonomously drive to serve the ordered food to the user position in consideration of the identified surrounding environment.

The autonomously driving robot may generate a map by using various sensors, and set a driving path plan on the map to thus perform its autonomous driving. Many robots use a two-dimensional (2D) light detection and ranging (LiDAR) sensor as a sensor for their driving. However, the 2D LiDAR sensor may scan the surrounding environment only at a height at which the sensor is mounted in the robot, and may perform inaccurate scanning in an environment with a black material absorbing light. A small robot may also use a depth camera. However, three-dimensional (3D) simultaneous localization and mapping (SLAM) using all depth data may require a lot of computing resources. A method has been recently devised in which only a specific height of the depth data is used as virtual scan data just like the 2D LiDAR sensor. However, also in this method, the surrounding environment may be scanned at a specific height like the method using the 2D LiDAR sensor. Therefore, in a case where there is no feature data at the scanned height, position recognition and localization on the map may become inaccurate.

SUMMARY

According to an aspect of the disclosure, a driving robot includes: a camera including a depth camera; and at least one processor configured to: control the camera to acquire depth data in one or more areas where the driving robot moves, identify, from the acquired depth data, a plurality of scan data sets corresponding to a plurality of predetermined height levels, identify, based on the plurality of scan data sets, a plurality of feature scores corresponding to the plurality of scan data sets, and generate at least one area map corresponding to at least one scan data set among the plurality of scan data sets, wherein a feature score, among the plurality of feature scores, corresponding to the at least one scan data set is greater than or equal to a predetermined critical value.

The at least one processor may be further configured to: identify as a main area map a first scan data set among the plurality of scan data sets corresponding to a highest identified feature score among the plurality of feature scores, and based on identification of one or more feature scores among the plurality of feature scores greater than the predetermined critical value, identify as a sub-area map each scan data set of the plurality of scan data sets, other than the first scan data set, having a corresponding feature score, among the plurality of feature scores, greater than the predetermined critical value.

The at least one processor may be further configured to downscale each identified sub-area map.

The at least one processor may be further configured to identify the plurality of feature scores based on at least one of a number of angles, an angle size, a number of lines, and a sharpness of the scan data.

The one or more areas where the driving robot moves collectively form an entire area, and the at least one processor may be further configured to: identify, within the plurality of scan data sets, one or more area scan data sets corresponding to each of the one or more areas within the entire area, identify, for each of the one or more area scan data sets, a plurality of area feature scores corresponding to each of the plurality of predetermined height levels, identify, based on the plurality of area feature scores, a plurality of area-wide feature scores corresponding to the plurality of predetermined height levels in the entire area, identify a first predetermined height level among the plurality of predetermined height levels corresponding to a highest area-wide feature score among the plurality of area-wide feature scores, and generate a map of the entire area based on each scan data set of the plurality of scan data sets corresponding to the first predetermined height level.

The at least one processor may be further configured to: set a weight for the at least one area map based on the feature score of the at least one area map, and identify a position and a direction of the driving robot based on the at least one area map having the set weight and the plurality of scan data sets.

The one or more areas where the driving robot moves collectively form an entire area, and the at least one processor may be further configured to: identify a height level among the plurality of predetermined height levels as a reference height level, and generate a map of the entire area based on scan data sets among the plurality of scan data sets corresponding to the reference height level identified in each of the one or more areas.

The at least one processor may be further configured to identify as the reference height level a height level among the plurality of predetermined height levels corresponding to a highest feature score among the plurality of feature scores identified in an area of the one or more areas where the driving robot is initially positioned.

According to an aspect of the disclosure, a method of controlling a driving robot, the method including: acquiring depth data in one or more areas where the driving robot moves; identifying, from the acquired depth data, a plurality of scan data sets corresponding to a plurality of predetermined height levels; identifying, based on the plurality of scan data sets, a plurality of feature scores corresponding to the plurality of scan data sets; and generating at least one area map corresponding to at least one scan data set among the plurality of scan data sets, wherein a feature score, among the plurality of feature scores, corresponding to the at least one scan data set is greater than or equal to a predetermined critical value.

The generating the at least one area map further may include: identifying as a main area map a first scan data set among the plurality of scan data sets corresponding to a highest identified feature score among the plurality of feature scores, and based on identifying one or more feature scores among the plurality of feature scores greater than the predetermined critical value, identifying as a sub-area map each scan data set of the plurality of scan data sets, other than the first scan data set, having a corresponding feature score, among the plurality of feature scores, greater than the predetermined critical value.

The method may further include downscaling each identified sub-area map.

The identifying of the plurality of feature scores may further include identifying the plurality of feature scores based on at least one of a number of angles, an angle size, a number of lines, and a sharpness of the scan data.

The one or more areas where the driving robot moves collectively form an entire area, and the method may further include: identifying, within the plurality of scan data sets, one or more area scan data sets corresponding to each of the one or more areas within the entire area, identifying, for each of the one or more area scan data sets, a plurality of area feature scores corresponding to each of the plurality of predetermined height levels, identifying, based on the one or more pluralities of area feature scores, a plurality of area-wide feature scores corresponding to the plurality of predetermined height levels in the entire area, identifying a first predetermined height level among the plurality of predetermined height levels corresponding to a highest area-wide feature score among the plurality of area-wide feature scores, and generating a map of the entire area based on each scan data set of the plurality of scan data sets corresponding to the first predetermined height level.

The method may further include: setting a weight for the at least one area map based on the feature score of the at least one area map; and identifying a position and a direction of the driving robot based on the at least one area map having the set weight and the plurality of scan data sets.

The one or more areas where the driving robot moves collectively form an entire area, and the method may further include: identifying a height level among the plurality of predetermined height levels as a reference height level, and generating a map of the entire area based on scan data sets among the plurality of scan data sets corresponding to the reference height level identified in each of the one or more areas.

The driving robot may further include: identifying as the reference height level a height level among the plurality of predetermined height levels corresponding to a highest feature score among the plurality of feature scores identified in an area of the one or more areas where the driving robot is initially positioned.

According to an aspect of the disclosure, a non-transitory computer-readable storage medium has instructions stored therein, which when executed by a processor cause the processor to execute a method of controlling a driving robot, the method including: acquiring depth data in one or more areas where the driving robot moves; identifying, from the acquired depth data, a plurality of scan data sets corresponding to a plurality of predetermined height levels; identifying, based on the plurality of scan data sets, a plurality of feature scores corresponding to the plurality of scan data sets; and generating at least one area map corresponding to at least one scan data set among the plurality of scan data sets, wherein a feature score, among the plurality of feature scores, corresponding to the at least one scan data set is greater than or equal to a predetermined critical value.

The method further may include: identifying as a main area map a first scan data set among the plurality of scan data sets corresponding to a highest identified feature score among the plurality of feature scores, and based on identifying one or more feature scores among the plurality of feature scores greater than the predetermined critical value, identifying as a sub-area map each scan data set of the plurality of scan data sets, other than the first scan data set, having a corresponding feature score, among the plurality of feature scores, greater than the predetermined critical value.

The one or more areas where the driving robot moves collectively form an entire area, and the method may further include: identifying, within the plurality of scan data sets, one or more area scan data sets corresponding to each of the one or more areas within the entire area, identifying, for each of the one or more area scan data sets, a plurality of area feature scores corresponding to each of the plurality of predetermined height levels, identifying, based on the plurality of area feature scores, a plurality of area-wide feature scores corresponding to the plurality of predetermined height levels in the entire area, identifying a first predetermined height level among the plurality of predetermined height levels corresponding to a highest area-wide feature score among the plurality of area-wide feature scores, and generating a map of the entire area based on each scan data set of the plurality of scan data sets corresponding to the first predetermined height level.

An entire area may include the one or more areas where the driving robot moves, and the method further may include: identifying a height level among the plurality of predetermined height levels as a reference height level, and generating a map of the entire area based on scan data sets among the plurality of scan data sets corresponding to the reference height level identified in each of the one or more areas.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
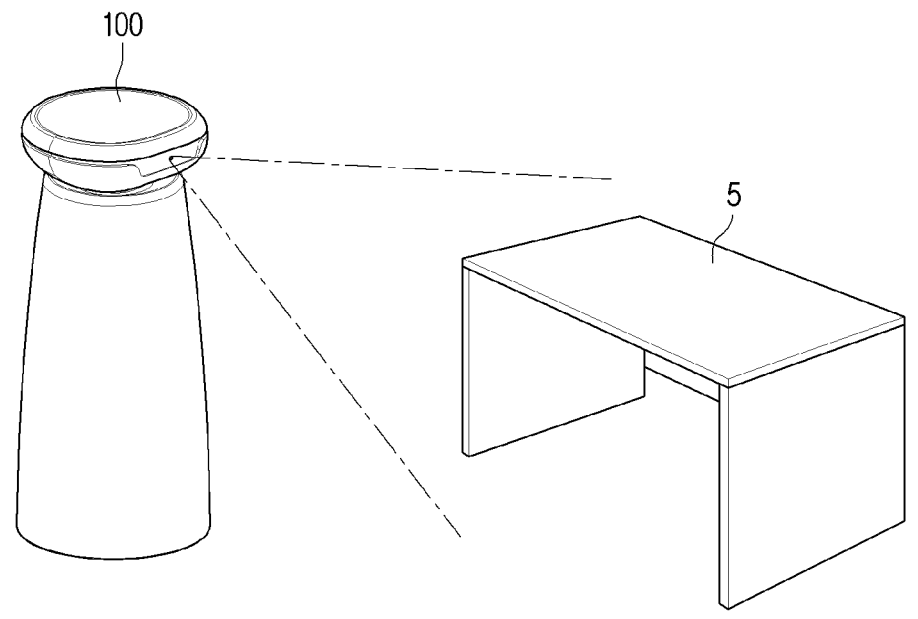
FIG. 1 is a view showing a driving robot according to one or more embodiments.

Hereinafter, various embodiments are described in more detail with reference to the accompanying drawings. One or more embodiments described in the specification may be modified in various ways. A specific embodiment may be shown in the drawings and described in detail in the detailed description. However, the specific embodiment disclosed in the accompanying drawings is provided only to assist in easy understanding of the various embodiments. Therefore, it should be understood that the spirit of the disclosure is not limited by the specific embodiment shown in the accompanying drawings, and includes all the equivalents and substitutions included in the spirit and scope of the disclosure.

Terms including ordinal numbers such as "first" and "second" may be used to describe various components. However, these components are not limited by these terms. The terms are used only to distinguish one component from another component.

It should be understood that terms "include" and "comprise" used in the specification specify the presence of features, numerals, steps, operations, components, parts, or combinations thereof, mentioned in the specification, and do not preclude the presence or addition of one or more other features, numerals, steps, operations, components, parts, or combinations thereof. It is to be understood that if one component is referred to as being "connected to" or "coupled to" another component, one component may be directly connected to or directly coupled to another component, or may be connected to or coupled to another component while having a third component interposed therebetween. On the other hand, it is to be understood that if one component is referred to as being "connected directly to" or "coupled directly to" another component, one component may be connected to or coupled to another component without a third component interposed therebetween.

Meanwhile, a term "module" or "~er/~or" for components used in the specification performs at least one function or operation. In addition, the "module" or "~er/~or" may perform the function or operation by hardware, software, or a combination of hardware and software. In addition, a plurality of "modules" or a plurality of "~ers/~ors" except for a "module" or "~er/~or" performed by specific hardware or performed by at least one processor may be integrated in at least one module. A term of a singular number may include its plural number unless explicitly indicated otherwise in the context.

In describing the disclosure, a sequence of each operation should be understood as non-restrictive unless a preceding operation in the sequence of each operation needs to logically and temporally precede a subsequent operation. That is, except for the above exceptional case, the essence of the disclosure is not affected even though a process described as the subsequent operation is performed before a process described as the preceding operation, and the scope of the disclosure should not be limited by the disclosed sequence of the operations. In addition, the expression "at least one of a, b or c" includes "only a", "only b", "only c", "both a and b", "both a and c", "both b and c", or "all of a, b, and c". In addition, the term "including" in the specification may have a meaning encompassing further including other components in addition to components listed as being included.

The specification only describes essential components necessary for describing the disclosure, and does not mention components unrelated to the essence of the disclosure. In addition, it should not be interpreted as an exclusive meaning that the disclosure includes only the mentioned components, but should be interpreted as a non-exclusive meaning that the disclosure may include other components as well.

In addition, in describing the disclosure, detailed descriptions are summarized or omitted where the detailed description for known functions or configurations related to the disclosure may unnecessarily obscure the gist of the disclosure. Meanwhile, the respective embodiments may be implemented or operated independently, and may be implemented or operated in combination.

FIG. 1 is a view showing a driving robot according to one or more embodiments.

FIG. 1 shows a driving robot 100. The driving robot 100 may generate a map while moving within a certain area. The driving robot 100 may move to an area A to generate an area map of the area A, and move to an area B to generate an area map of the area B. The driving robot 100 may generate an entire map (or a global map) based on the area map generated for each area. In a case where the map is generated, the driving robot 100 may set a movement plan based on the entire map. The driving robot 100 may perform localization based on an area map of an area where the driving robot 100 is positioned while moving based on the set movement plan. The localization may include a process of the driving robot 100 identifying its exact position and direction. The driving robot 100 may identify its exact position and direction based on the entire map and the driving map, and may move to a destination based on the movement plan.

For example, the driving robot 100 may generate a map of a third floor of a building including a first office, a hallway, and a second office. In this case, the driving robot 100 may move to the first office and generate an area map of the first office. The driving robot 100 may acquire data on the walls, objects, or the like of the first office. Depth data may include the data that the driving robot 100 acquires from the first office. For example, the driving robot 100 may acquire the depth data of a desk 5 positioned in the first office. The driving robot 100 may generate the area map of the first office based on the acquired depth data. In addition, the driving robot 100 may generate an area map of the hallway while moving along the hallway, and move to the second office to generate an area map of the second office.

In a case involving generating every area map of each zone on the third floor of the building, the driving robot 100 may generate an entire map of the third floor of the building based on the generated area maps. After generating the entire map, the driving robot 100 may move from the first office to the second office. The driving robot 100 may set a movement path from the first office to the second office based on the generated entire map. The driving robot 100 may move based on the set movement path. The driving robot 100 may identify its current position while moving. The driving robot 100 may acquire data on the current position while moving. For example, in a case where the driving robot 100 is positioned in the first office, it may acquire the depth data of the walls, objects, or the like of the first office. The driving robot 100 may compare the acquired depth data with the generated area map, and identify that the acquired depth data matches or is most similar to the area map of the first office. The driving robot 100 may identify that the current position is the first office. In addition, the driving robot 100 may identify which area of the area map of the first office the depth data of the first office acquired from the front matches or is most similar to. The driving robot 100 may identify that the matching or most similar area in the area map of the first office is a direction in which the driving robot 100 is heading. The driving robot 100 may move by identifying its direction to move based on the identified position and direction, the set movement path, and the entire map. The driving robot 100 may move from the first office to the second office while repeating the above process.

Hereinabove, the description describes a schematic example in which the driving robot 100 generates a map and moves. The following description describes a configuration of the driving robot.

Figure 2:
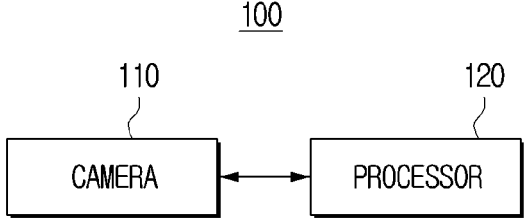
FIG. 2 is a block diagram showing a configuration of the driving robot according to one or more embodiments.

FIG. 2 is a block diagram showing the configuration of the driving robot according to one or more embodiments.

Referring to FIG. 2, the driving robot 100 may include a camera 110 and a processor 120.

The camera 110 may capture a surrounding environment of the driving robot 100. The processor 120 may identify data on the surrounding environment based on an image captured by the camera 110. The camera 110 may include a depth camera, and acquire depth data of the surrounding environment. For example, the camera 110 may acquire the depth data of a wall and an object in a case where the camera 110 including the depth camera captures a space where the wall and the object are disposed. In addition, the camera 110 may include a red-green-blue (RGB) camera, a wide-angle camera, a telephoto camera, and the like in addition to the depth camera.

The driving robot 100 may include one or a plurality of processors 120. The processor 120 may control each component of the driving robot 100. For example, the processor 120 may control the camera 110 to acquire the depth data of the surrounding environment.

The processor 120 may identify scan data of a plurality of predetermined height levels from the acquired depth data. The camera 110 may acquire all the depth data within a range of a field of view of the camera 110. The processor 120 may include data on one or more specific height levels to be virtually scanned. The processor 120 may identify the scan data by scanning depth data of the predetermined height level from the acquired depth data. For example, the processor 120 may set a height level of 0.2 m, a height level of 0.4 m, and a height level of 0.6 m as height levels to be scanned. The processor 120 may then scan each depth data corresponding to the set height level, and identify scan data of the height level of 0.2 m, scan data of the height level of 0.4 m, and scan data of the height level of 0.6 m. The processor 120 may identify a feature score of each identified scan data. For example, the processor 120 may identify the feature score based on the number of angles, angles (i.e., a size of an angle), number of lines of the scan data, and sharpness or the like of the scan data (or the angle or the line). The processor 120 may generate scan data of at least one height level having an identified predetermined critical value or higher as the area map. For example, the predetermined critical value may be 30 points, and the processor 120 may set that the scan data of the height level of 0.2 m has a feature score of 10 points, the scan data of the height level of 0.4 m has a feature score of 40 points, and the scan data of the height level of 0.6 m has a feature score of 60 points. In this case, the processor 120 may generate each of the scan data of the height level of 0.4 m and the scan data of the height level of 0.6 m as an area map of the corresponding area.

The processor 120 may identify scan data having the highest feature score as a main area map, and the other scan data as a sub-area map, among the scan data of the height levels each having a feature score of the predetermined critical value or higher, in a case of generating the plurality of area maps. In addition, the processor 120 may downscale the sub-area map. For example, the processor 120 may identify an area map of the height level of 0.6 m having the highest feature score as the main area map, and may identify the other area map of the height level of 0.4 m as the sub-area map among the area map of the height level of 0.4 m and the area map of the height level of 0.6 m. The processor 120 may downscale the area map of the height level of 0.4 m identified as the sub-area map. That is, the processor 120 may reduce the size, resolution, and data amount of the sub-area map.

As the driving robot 100 moves in each area, the processor 120 may identify the scan data of the plurality of levels of the area where the driving robot 100 is positioned in the above-described manner to thus generate one or more area maps. In a case where the driving robot 100 explores all areas and generates an area map of all the areas, the processor 120 may generate the entire map based on the scan data of each area. The processor 120 may identify the feature score for each height level in the entire area based on feature scores of the scan data of the plurality of height levels identified in each area. In addition, the processor 120 may generate scan data of a level having the highest feature score or the highest average feature score for each height level in the entire area as the entire map.

For example, the processor 120 may identify that the scan data of the height level of 0.2 m has the feature score of 10 points, the scan data of the height level of 0.4 m has the feature score of 40 points, and the scan data of the height level of 0.6 m has the feature score of 60 points, in the area A. The processor 120 may identify that the scan data of the height level of 0.2 m has a feature score of 30 points, the scan data of the height level of 0.4 m has a feature score of 70 points, and the scan data of the height level of 0.6 m has a feature score of 50 points, in the area B. The processor 120 may identify that the scan data of the height level of 0.2 m has a feature score of 40 points, the scan data of the height level of 0.4 m has a feature score of 30 points, and the scan data of the height level of 0.6 m has a feature score of 70 points, in an area C. The processor 120 may identify that the scan data of the height level of 0.2 m has a feature score of 80 points (10 points+30 points+40 points), the scan data of the height level of 0.4 m has a feature score of 140 points (40 points+70 points+30 points), and the scan data of the height level of 0.6 m has a feature score of 180 points (60 points+50 points+70 points), in the entire area. As the scan data of the height level of 0.6 m has the highest feature score in the entire area, the processor 120 may generate the scan data of the height level of 0.6 m as the entire map. That is, the processor 120 may generate the entire map by connecting or integrating (e.g., connecting, integrating, or putting together) the scan data of the height level of 0.6 m in the area A, the scan data of the height level of 0.6 m in the area B, and the scan data of the height level of 0.6 m in the area C to one another.

Alternatively, the processor 120 may identify a reference height level, and generate scan data of the reference height level identified in each area as the entire map. For example, the processor 120 may identify a height level of the scan data having the highest feature score identified in an area where the driving robot is initially positioned as the reference height level. For example, the processor 120 may control the camera 110 to acquire the depth data at 360 degrees while rotating the driving robot 100 in the area where the driving robot is initially positioned in a horizontal direction. The processor 120 may identify the scan data of the plurality of predetermined height levels from the acquired depth data at 360 degrees. The processor 120 may identify the feature score of the scan data of each identified height level. The processor 120 may identify the level of the scan data having the highest feature score as the reference height level. The processor 120 may generate the entire map by identifying the scan data of the reference height level in each area where the driving robot 100 moves, and connecting the scan data of the identified reference height level to each other. The processor 120 may set the movement path based on the generated entire map, and may perform a localization process of the driving robot 100 based on the generated area map. The localization process may be a process of the driving robot 100 identifying its current position and direction.

The processor 120 may identify the position and direction of the driving robot 100 based on the generated area map. After generating the map, the processor 120 may move the driving robot 100 from the current position of the driving robot 100 to the destination. The processor 120 may set a weight for each area map based on the feature score of the generated area map (or scan data). The processor 120 may set a high weight for an area map having a high feature score and a low weight for an area map having a low feature score. For example, the processor 120 may set the feature score as the weight. That is, the feature score corresponding to each area map may be used as the weight. Alternatively, the processor 120 may set the weight only for an area map having the highest feature score and ignore the other area maps. Alternatively, the processor 120 may set no weight for an area map determined to be unnecessary in a specific area. The processor 120 may acquire the depth data in the area where the driving robot 100 is positioned, and identify the scan data of the predetermined height level. The processor 120 may compare the identified scan data with the generated area map. The processor 120 may identify an area map matching the identified scan data or an area map having the highest similarity to the scan data. The processor 120 may identify the position and direction of the driving robot 100 based on the identified area map.

The processor 120 may generate the entire map to be used for a path plan by integrating the area map of the height level having the highest average score or the height level having the highest sum of the feature scores among the area maps having the feature score of the critical value or higher. In a case where the robot 100 drives, the processor 120 may perform the localization by virtually scanning the area map of a candidate area and depth data corresponding to a specific height of the candidate area map. The processor 120 may determine the current position of the robot by applying (or integrating) the weight of each area map. The processor 120 may use an area map and a weight, corresponding to virtual scan data at one or more specific heights determined through the above-described process, to determine the current position of the robot 100, even though results may partially vary based on a localization algorithm.

Figure 3:
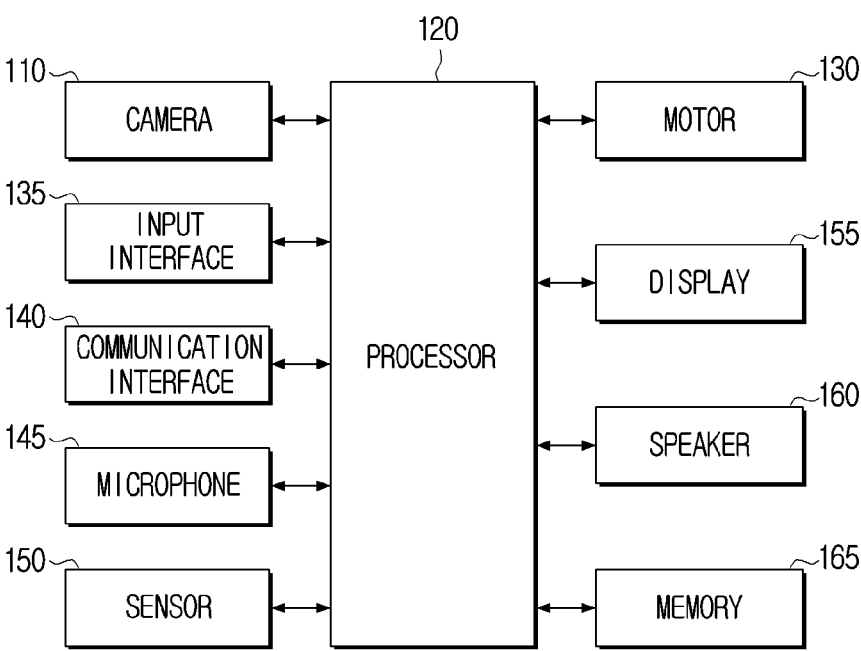
FIG. 3 is a block diagram showing a specific configuration of the driving robot according to one or more embodiments.

FIG. 3 is a block diagram showing a specific configuration of the driving robot according to one or more embodiments.

Referring to FIG. 3, the driving robot may include the camera 110, the processor 120, a motor 130, an input interface 135, a communication interface 140, a microphone 145, a sensor 150, a display 155, a speaker 160, and a memory 165.

The motor 130 may move the driving robot 100, and move the components of the driving robot 100. For example, the motor 130 may rotate or move the driving robot 100 by driving a wheel of the driving robot 100. Alternatively, the motor 130 may move the camera 110 of the driving robot 100, and move an arm or the like. A plurality of motors 130 may be included in the driving robot 100, and each motor 130 may move each component of the driving robot 100.

The input interface 135 may receive a control command from a user. For example, the input interface 135 may receive the command such as power on/off, an input for a set value of the driving robot 100, and menu selection from the user. The input interface 135 may include a keyboard, a button, a key pad, a touch pad, or a touch screen. The input interface 135 may also be referred to as an input device, an inputter, an input module, or the like.

The communication interface 140 may perform communication with an external device. For example, the communication interface 140 may perform the communication with the external device by using at least one of communication methods such as wireless-fidelity (Wi-Fi), Wi-Fi direct, Bluetooth, ZigBee, third generation (3G), third generation partnership project (3GPP), or long term evolution (LTE). The communication interface 140 may also be referred to as a communication device, a communicator, a communication module, a transceiver, or the like.

The microphone 145 may receive a user voice. For example, the microphone 145 may receive the control command or the like as the voice input from the user. The processor 120 may recognize the control command based on the input user voice and perform a related control operation. For example, the driving robot 100 may include one or more microphones 145. The microphone 145 may include a general microphone, a surround microphone, a directional microphone, or the like.

The sensor 150 may detect the surrounding environment. The sensor 150 may detect the depth data of the surrounding environment. Alternatively, the sensor 150 may detect a road surface condition, unevenness on a floor, an obstacle, and the like. For example, the sensor 150 may include an angle sensor, an acceleration sensor, a gravity sensor, a gyro sensor, a geomagnetic sensor, a direction sensor, an infrared sensor, an ultrasonic sensor, a time-of-flight (ToF) sensor, a light detection and ranging (LiDAR) sensor, a laser sensor, a motion recognition sensor, a heat sensor, an image sensor, a tracking sensor, a proximity sensor, an illuminance sensor, a voltmeter, an ammeter, a barometer, a hygrometer, a thermometer, a touch sensor, or the like.

The display 155 may output data processed by the processor 120 as an image. The display 155 may display data and output a screen corresponding to a recognized user command. For example, the display 155 may be implemented as a liquid crystal display (LCD), an organic light emitting diode (OLED) display, a flexible display, a touch screen, or the like. In case that the display 155 is implemented as the touch screen, the driving robot 100 may receive the control command through the touch screen.

The speaker 160 may output a sound signal. For example, the speaker 160 may output data related to a user input command, data related to warning, data related to a state of the driving robot 100, data related to an operation of the driving robot 100, or the like as a voice or a notification sound.

The memory 165 may store data, algorithms, or the like that perform functions of the driving robot 100, and may store programs, instructions, or the like driven by the driving robot 100. Alternatively, the memory 165 may store the data on one or more specific height levels to be virtually scanned, the depth data, the entire map, the area map, the weight data, or the like. The algorithm or data stored in the memory 165 may be loaded into the processor 120 under control of the processor 120 to perform the map generation process or the localization process. For example, the memory 165 may be implemented as a type of a read-only memory (ROM), a random access memory (RAM), a hard disk drive (HDD), a solid state drive (SDD), a memory card, or the like.

The driving robot 100 may include all of the above-described components or may include some of the components. Hereinafter, the description describes the configuration of the driving robot 100. The following description describes the map generation process and the localization process from the generated map, performed by the driving robot 100.

FIGS. 4A, 4B, 4C, and 4D are views showing a process of generating an area map having a plurality of height levels according to one or more embodiments.

Figure 4A:
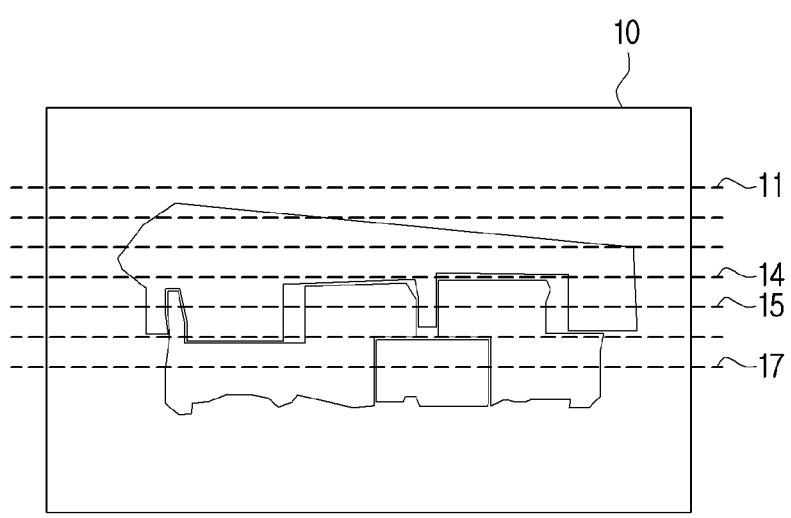
FIGS. 4A, 4B, 4C, and 4D are views showing a process of generating an area map having a plurality of height levels according to one or more embodiments.

FIG. 4A shows the depth data. The driving robot 100 may acquire depth data 10 of the surrounding environment by using the camera 110. For example, the camera 110 may include the depth camera and acquire the depth data 10 within the range of the field of view. The depth data 10 may include depth data of a wall, depth data of an object, or the like.

The driving robot 100 may identify scan data of a plurality of height levels 11, 14, 15, and 17 from the acquired depth data 10. The height level may be a predetermined height level to be virtually scanned by the driving robot 100 from the acquired depth data 10. For example, the plurality of height levels 11, 14, 15, and 17 may include the first level 11, the fourth level 14, the fifth level 15, and the seventh level 17 (where intervening levels may also be scanned, but for the purposes of this disclosure, only these exemplary levels are discussed). Here, the first level 11 may be a level corresponding to an actual height of 1.4 m, the fourth level 14 may be a level corresponding to an actual height of 0.8 m, the fifth level 15 may be a level corresponding to an actual height of 0.6 m, and the seventh level 17 may be a level corresponding to an actual height of 0.2 m. The driving robot 100 may detect its distance to a wall surface by using a distance sensor, an ultrasonic sensor, or the like. In addition, the driving robot 100 may detect an angle of an object or an angle of a specific position of the object by using the angle sensor or the like. Alternatively, the driving robot 100 may recognize angle data of the camera 110, and thus identify the angle of an object, the angle of the specific position of an object, or the angle of the specific position of a wall surface based on the angle data of the camera 110. The driving robot 100 may calculate actual height data based on the detected distance data or angle data.

Figure 4B:
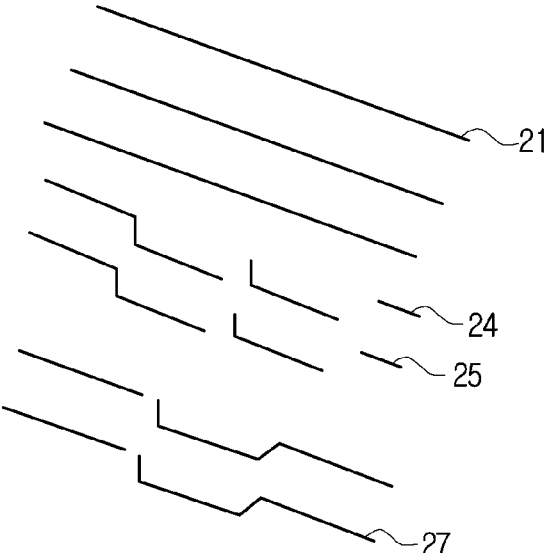

FIG. 4B shows scan data of each height level.

The driving robot 100 may acquire scan data 21, 24, 25, or 27 of each height level 11, 14, 15, or 17. The first scan data 21 may correspond to the first height level, the fourth scan data 24 may correspond to the fourth height level, the fifth scan data 25 may correspond to the fifth level 15, and the seventh scan data 27 may correspond to the seventh level 17.

Each scan data 21, 24, 25, or 27 may be data scanned along a line at a specific height of the depth data 10. Accordingly, each scan data 21, 24, 25, or 27 may include the depth data. The depth data 10 indicates a degree of depth of the object (or the wall surface), and may thus include unevenness data. Accordingly, each scan data 21, 24, 25, or 27 scanned along the line of the specific height may include a line and an angle based on the depth (or unevenness) of an object (or a wall surface).

The driving robot 100 may identify the feature score of the scan data of each height level. For example, the feature score may be calculated based on the number of angles, angles, number of lines, sharpness or the like of the lines or the angles. For example, the driving robot 100 may assign the higher feature score to the larger number of angles or lines. Alternatively, the driving robot 100 may assign the higher feature score to the larger angle. Alternatively, the driving robot 100 may assign the higher feature score to the higher sharpness. The larger number of angles or lines or the larger angle may indicate a greater change in depth. That is, a high feature score may indicate that an object (or a wall) has many identifiable features. In addition, high sharpness may indicate that there is a lot of reflected light. For example, a white wall may have scan data of the high sharpness, and a black wall may have scan data of low sharpness. A lot of reflected light may indicate that a lot of feature data of the wall or the object is acquired. That is, the scan data having the high feature score may indicate that the scan data includes many features of the wall or the object.

The driving robot 100 may generate scan data having a feature score higher than the critical value as the area map.

The driving robot 100 may identify the scan data 21, 24, 25, or 27 having the feature score higher than the critical value among the scan data of each height level. The driving robot 100 may acquire the depth data in various directions from its current position, and acquire the scan data in various directions similarly to the process described above. In addition, the driving robot 100 may generate the area map based on the acquired scan data in various directions.

Figure 4C:
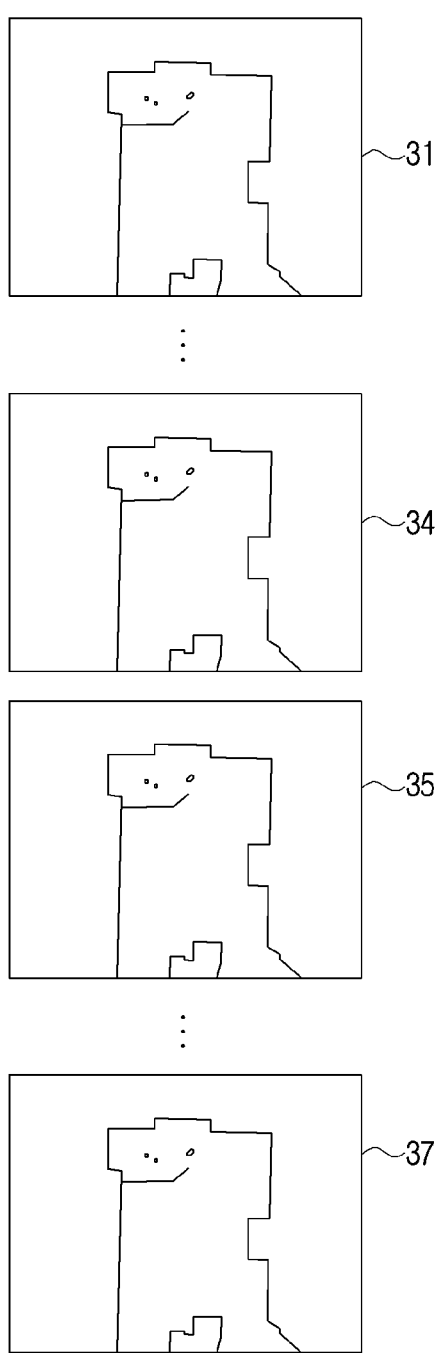

FIG. 4C shows the area map.

For example, the driving robot 100 may identify the first scan data 21, the fourth scan data 24, the fifth scan data 25, and the seventh scan data 27 as the scan data having the feature score higher than the critical value. As shown in FIG. 4C, the driving robot 100 may generate the first scan data 21 as a first area map 31, set the fourth scan data 24 as a fourth area map 34, set the fifth scan data 25 as a fifth area map 35, and set the seventh scan data 27 as a seventh area map 37. Each area map 31, 34, 35, or 37 shown in FIG. 4C may be an area map generated based on the scan data of each height level of one depth data 10. Accordingly, each area map 31, 34, 35, or 37 shown in FIG. 4C may be an area map with a different height at the same position.

The driving robot 100 may use the area map 31, 34, 35, or 37 higher than the critical value in the localization process. The driving robot 100 may distinguish the main area map and the sub-area map from each other and downscale the sub-area map to reduce the data amount.

Figure 4D:
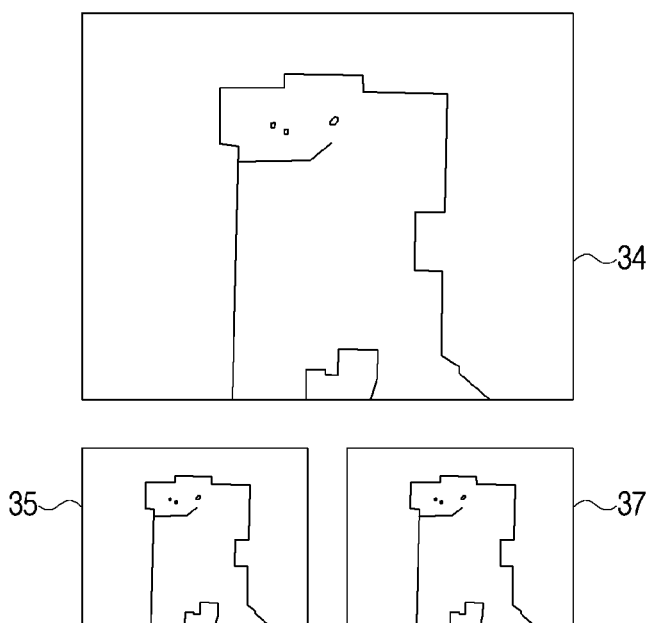

FIG. 4D shows one main area map and two sub-area maps.

As described above, the driving robot 100 may generate the area map of each level by connecting the scan data of each level acquired in various directions of the corresponding position. For example, the driving robot 100 may generate the first area map by connecting scan data of a first level acquired in various directions to each other, generate the fourth area map by connecting scan data of a fourth level to each other, generate the fifth area map by connecting scan data of a fifth level to each other, and generate the seventh area map by connecting scan data of a seventh level to each other. The driving robot 100 may determine an area map to be used for the localization based on the feature score of the generated area map. For example, the driving robot 100 may determine that the fourth area map 34, the fifth area map 35, and the seventh area map 37 are higher than the predetermined critical value as the area maps to be used for the localization.

The driving robot 100 may identify scan data having the identified highest feature score as the main area map 34, and identify the other scan data as the sub-area maps 35 and 37. For example, the fourth area map 34 may have the highest feature score. In this case, the driving robot 100 may determine the fourth area map 34 as the main area map, and determine the fifth area map 35 and the seventh area map 37 as the sub-area maps. In addition, the driving robot 100 may downscale the fifth area map 35 and the seventh area map 37 determined as the sub-area maps.

The driving robot 100 may reduce the data amount by downscaling the sub-area maps. Alternatively, the driving robot 100 may store the main area map (or scan data) and the sub-area map (or scan data), and delete an area map (or scan data) other than the area map determined to be used for the localization. Alternatively, the driving robot 100 may delete the area map other than the main area map. That is, the driving robot 100 may store only an area map (or scan data) having the feature score of a predetermined score or higher to reduce the data amount.

Alternatively, the driving robot 100 may store all the area maps (or scan data), and use only the area map (or scan data) having the predetermined score or higher for the localization. The driving robot 100 may use the stored area map (or scan data) not to be used for the localization for another purpose. For example, the driving robot 100 may use the stored area map in case of generating the entire map, and may use this additional area map in case of failing to accurately identify its position or direction.

The driving robot 100 may generate the area map through the above process, and determine the area map to be used for the localization. The driving robot 100 may generate and determine the area map of each area. In case of generating the area map of the entire area, the driving robot 100 may identify the feature score of the area map having each height level in the entire area. In addition, the driving robot 100 may generate the entire map by connecting area maps of the height level to which the highest feature score is assigned in the entire area to each other.

Alternatively, the driving robot 100 may acquire the depth data while rotating around 360 degrees. In addition, the driving robot 100 may acquire the scan data of each height level from the acquired depth data and identify the feature score. The driving robot 100 may determine the scan data of a height level having the highest feature score among the scan data of each identified height level. The driving robot 100 may identify the height level of the scan data having the highest feature score as the reference height level, and generate the entire map based on the scan data of the reference height level.

The driving robot 100 may use the entire map in case of setting its movement path, and use the area map of each area in case of determining its position and direction.

Figure 5A:
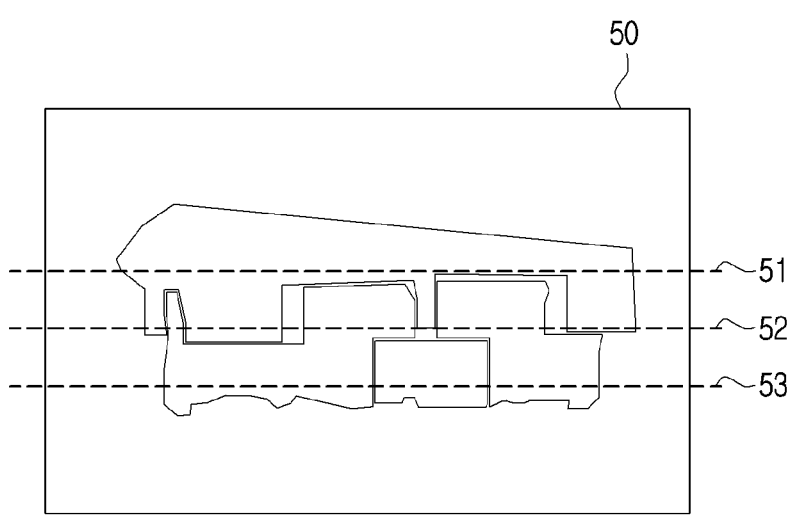
FIGS. 5A and 5B are views showing a localization process according to one or more embodiments.
Figure 5B:
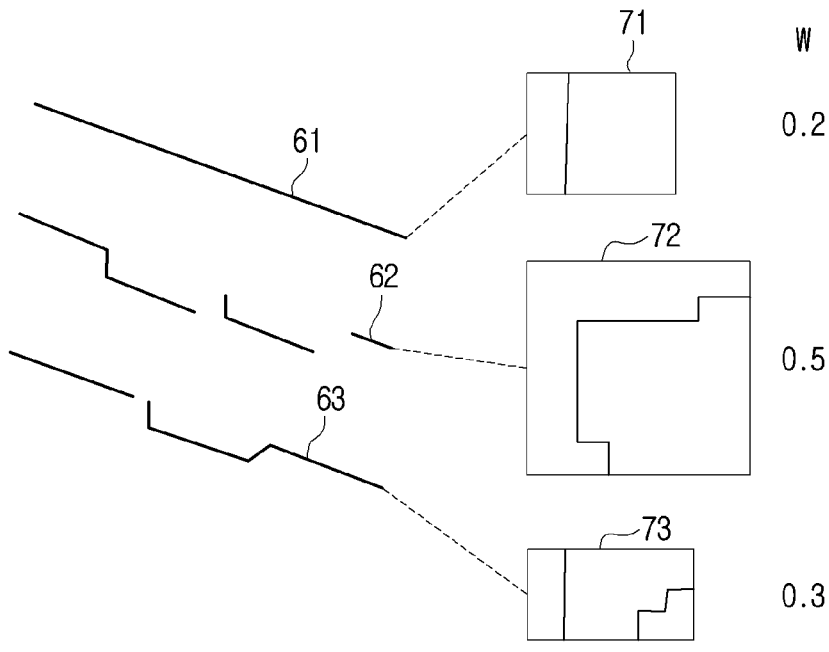

FIGS. 5A and 5B are views showing the localization process according to one or more embodiments.

FIG. 5A shows the depth data. The driving robot 100 may generate the entire map, and then move from its current position (e.g., point A) to another position (e.g., point B). The driving robot 100 may set its path for moving from the point A to the point B by using the entire map. The driving robot 100 may move based on the set movement path. The driving robot 100 may identify its current position and direction while moving.

The driving robot 100 may acquire depth data 50 of the surrounding environment by using the camera 110. The driving robot 100 may identify scan data of a plurality of height levels 51, 52, and 53 from the acquired depth data 50. Scan data identified while the driving robot is moving may be equal to or less than scan data identified in case that the driving robot generates the area map.

FIG. 5B shows the scan data of each height level.

The driving robot 100 may acquire scan data 61, 62, or 63 of each height level. The driving robot 100 may compare the acquired scan data 61, 62, or 63 of each height level with generated area map 71, 72, or 73. Here, the driving robot 100 may set a weight for each area map 71, 72, or 73 based on a feature score of the generated area map 71, 72, or 73. For example, the driving robot 100 may respectively set weights of 0.5, 0.3, and 0.2 on the second area map 72, the third area map 73, and the first area map 71 in case that the feature score is higher in an order of the second area map 72, the third area map 73, and the first area map 71. The weight may be the feature score of each area map 71, 72, or 73. In addition, the driving robot 100 may identify its position and direction corresponding to the area map matching or have the highest similarity based on the area map 71, 72, or 73 having the set weight and the acquired scan data 61, 62, or 63. The position and direction identified by the driving robot 100 may be the position and direction of the driving robot 100. The driving robot 100 may identify the position and direction while moving in the above-described manner.

Hereinafter, the description describes the various embodiments in which the driving robot 100 generates the map and identifies its position and a direction. The following description describes a controlling method of a driving robot.

Figure 6:
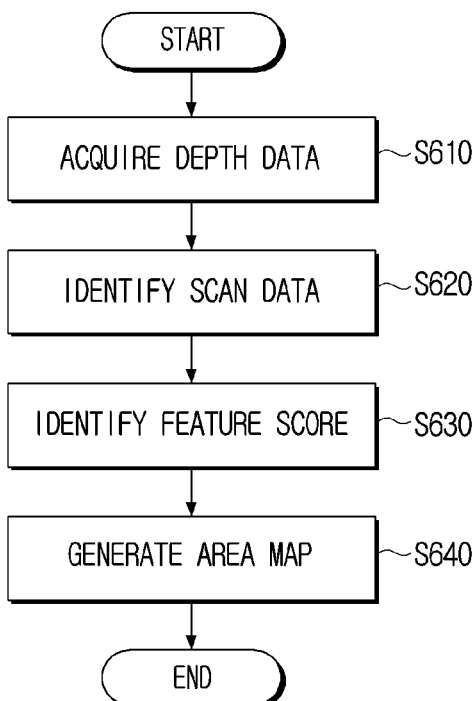
FIG. 6 is a flowchart showing a controlling method of a driving robot according to one or more embodiments.

FIG. 6 is a flowchart showing the controlling method of a driving robot according to one or more embodiments.

Referring to FIG. 6, the driving robot may acquire depth data (S610). The driving robot may acquire the depth data of each area where the driving robot moves. The driving robot may then identify scan data (S620). The driving robot may identify the scan data of a plurality of predetermined height levels from the acquired depth data.

The driving robot may identify a feature score (S630). The driving robot 100 may identify the feature score of each of the identified scan data of the plurality of height levels. For example, the driving robot may identify the feature score based on the number of angles, angles, number of lines, sharpness or the like of the scan data.

The driving robot may generate an area map (S640). The driving robot may generate scan data of a height level having the identified feature score of a predetermined critical value or higher as the area map. The driving robot may generate one or more area map. For example, the driving robot may identify an area map having a feature score of the predetermined critical value or higher in case of generating the plurality of area maps. The driving robot may identify an area map generated from scan data having the highest feature score as a main area map, and identify an area map generated from the other scan data as a sub-area map, among the area maps identified as having the critical value or higher. The driving robot may downscale the identified sub-area map. The driving robot may also store or delete an area map other than the area map identified as the main area map or the sub-area map (or scan data). Alternatively, the driving robot may store or delete scan data less than the predetermined critical value.

The driving robot may generate an entire map based on the area maps. For example, the driving robot may identify the feature score for each height level in an entire area based on the feature scores of the scan data of the plurality of height levels identified in each area. The driving robot may generate the scan data of a level having the highest feature score for each height level in the identified entire area as the entire map. Alternatively, the driving robot may identify a reference height level, and generate scan data of the reference height level identified in each area as the entire map. For example, the driving robot may identify a height level of the scan data having the highest feature score identified in an area where the driving robot is initially positioned as the reference height level.

The driving robot may set a weight based on the feature score of the area map. The driving robot may identify its position and direction based on at least one area map having the set weight and the acquired scan data.

Advantageous effects of the disclosure are not limited to those mentioned above, and other effects not mentioned here may be obviously understood by those skilled in the art from the above description.

The controlling method of the driving robot according to the various embodiments described above may be provided as a computer program product. The computer program product may include a software (S/W) program itself or a non-transitory computer-readable medium in which the S/W program is stored.

The non-transitory computer-readable medium is not a medium that temporarily stores data, such as a register, a cache, or a memory, and indicates a medium that semi-permanently stores data and is readable by a machine. In detail, the various applications or programs described above may be stored and provided in the non-transitory computer-readable medium such as a compact disk (CD), a digital versatile disk (DVD), a hard disk, a Blu-ray disk, a universal serial bus (USB), a memory card, or a read only memory (ROM).

In addition, although the embodiments are shown and described in the disclosure as above, the disclosure is not limited to the above mentioned specific embodiments, and may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A driving robot comprising:
a camera comprising a depth camera; and
at least one processor configured to:
control the camera to acquire, in one or more areas where the driving robot moves, depth data comprising a plurality of scan data sets, wherein each of the plurality of scan data sets corresponds to a predetermined height level among a plurality of predetermined height levels,
identify, based on the plurality of scan data sets, a plurality of feature scores corresponding to the plurality of scan data sets, and
generate at least one area map corresponding to at least one scan data set among the plurality of scan data sets, wherein a feature score, among the plurality of feature scores, corresponding to the at least one scan data set is greater than or equal to a predetermined critical value.

2. The driving robot of claim 1, wherein the at least one processor is further configured to:
identify as a main area map a first scan data set among the plurality of scan data sets corresponding to a highest identified feature score among the plurality of feature scores, and
based on identification of one or more feature scores, among the plurality of feature scores, greater than the predetermined critical value, identify as a sub-area map each scan data set of the plurality of scan data sets, other than the first scan data set, having a corresponding feature score, among the plurality of feature scores, greater than the predetermined critical value.

3. The driving robot of claim 2, wherein the at least one processor is further configured to downscale each identified sub-area map.

4. The driving robot of claim 1, wherein the at least one processor is further configured to identify the plurality of feature scores based on at least one of a number of angles, an angle size, a number of lines, and a sharpness of the depth data.

5. The driving robot of claim 1, wherein the one or more areas where the driving robot moves collectively form an entire area, and
wherein the at least one processor is further configured to:
identify, within the plurality of scan data sets, one or more area scan data sets corresponding to each of the one or more areas within the entire area,
identify, for each of the one or more area scan data sets, a plurality of area feature scores corresponding to each of the plurality of predetermined height levels,
identify, based on the plurality of area feature scores, a plurality of area-wide feature scores corresponding to the plurality of predetermined height levels in the entire area,
identify a first predetermined height level, among the plurality of predetermined height levels, corresponding to a highest area-wide feature score among the plurality of area-wide feature scores, and
generate a map of the entire area based on each scan data set of the plurality of scan data sets corresponding to the first predetermined height level.

6. The driving robot of claim 5, wherein the at least one processor is further configured to:
set a weight for the at least one area map based on the feature score of the at least one area map, and
identify a position and a direction of the driving robot based on the at least one area map having the set weight and the plurality of scan data sets.

7. The driving robot of claim 1, wherein the one or more areas where the driving robot moves collectively form an entire area, and
wherein the at least one processor is further configured to:
identify a height level among the plurality of predetermined height levels as a reference height level, and
generate a map of the entire area based on scan data sets, among the plurality of scan data sets, corresponding to the reference height level identified in each of the one or more areas.

8. The driving robot of claim 7, wherein the at least one processor is further configured to identify as the reference height level a height level among the plurality of predetermined height levels corresponding to a highest feature score among the plurality of feature scores identified in an area of the one or more areas where the driving robot is initially positioned.

9. A method of controlling a driving robot, the method comprising:
acquiring, in one or more areas where the driving robot moves, depth data comprising a plurality of scan data sets, wherein each of the plurality of scan data sets corresponds to a predetermined height level among a plurality of predetermined height levels;
identifying, based on the plurality of scan data sets, a plurality of feature scores corresponding to the plurality of scan data sets; and
generating at least one area map corresponding to at least one scan data set among the plurality of scan data sets, wherein a feature score, among the plurality of feature scores, corresponding to the at least one scan data set is greater than or equal to a predetermined critical value.

10. The method of claim 9, wherein the generating the at least one area map further comprises:

identifying as a main area map a first scan data set among the plurality of scan data sets corresponding to a highest identified feature score among the plurality of feature scores, and based on identifying one or more feature scores among the plurality of feature scores greater than the predetermined critical value, identifying as a sub-area map each scan data set of the plurality of scan data sets, other than the first scan data set, having a corresponding feature score, among the plurality of feature scores, greater than the predetermined critical value.

11. The method of claim 10, further comprising:

downscaling each identified sub-area map.

12. The method of claim 9, wherein the identifying of the plurality of feature scores further comprises identifying the plurality of feature scores based on at least one of a number of angles, an angle size, a number of lines, and a sharpness of the depth data.

13. The method of claim 9, wherein the one or more areas where the driving robot moves collectively form an entire area, and wherein the method further comprises:

identifying, within the plurality of scan data sets, one or more area scan data sets corresponding to each of the one or more areas within the entire area, identifying, for each of the one or more area scan data sets, a plurality of area feature scores corresponding to each of the plurality of predetermined height levels, identifying, based on the plurality of area feature scores, a plurality of area-wide feature scores corresponding to the plurality of predetermined height levels in the entire area, identifying a first predetermined height level among the plurality of predetermined height levels corresponding to a highest area-wide feature score among the plurality of area-wide feature scores, and generating a map of the entire area based on each scan data set of the plurality of scan data sets corresponding to the first predetermined height level.

14. The method of claim 13, further comprising:

setting a weight for the at least one area map based on the feature score of the at least one area map; and identifying a position and a direction of the driving robot based on the at least one area map having the set weight and the plurality of scan data sets.

15. The method of claim 9, wherein the one or more areas where the driving robot moves collectively form an entire area, and wherein the method further comprises:

identifying a height level among the plurality of predetermined height levels as a reference height level, and generating a map of the entire area based on scan data sets among the plurality of scan data sets corresponding to the reference height level identified in each of the one or more areas.

16. The method of claim 15, further comprising:

identifying as the reference height level a height level among the plurality of predetermined height levels corresponding to a highest feature score among the plurality of feature scores identified in an area of the one or more areas where the driving robot is initially positioned.

17. A non-transitory computer-readable storage medium having instructions stored therein, which when executed by a processor cause the processor to execute a method of controlling a driving robot, the method comprising:

acquiring, in one or more areas where the driving robot moves, depth data comprising a plurality of scan data sets, wherein each of the plurality of scan data sets corresponds to a predetermined height level among a plurality of predetermined height levels;

identifying, based on the plurality of scan data sets, a plurality of feature scores corresponding to the plurality of scan data sets; and generating at least one area map corresponding to at least one scan data set among the plurality of scan data sets, wherein a feature score, among the plurality of feature scores, corresponding to the at least one scan data set is greater than or equal to a predetermined critical value.

18. The non-transitory computer-readable medium of claim 17, wherein the method further comprises:

identifying as a main area map a first scan data set among the plurality of scan data sets corresponding to a highest identified feature score among the plurality of feature scores, and based on identifying one or more feature scores among the plurality of feature scores greater than the predetermined critical value, identifying as a sub-area map each scan data set of the plurality of scan data sets, other than the first scan data set, having a corresponding feature score, among the plurality of feature scores, greater than the predetermined critical value.

19. The non-transitory computer-readable medium of claim 17, wherein the one or more areas where the driving robot moves collectively form an entire area, and wherein the method further comprises:

identifying, within the plurality of scan data sets, one or more area scan data sets corresponding to each of the one or more areas within the entire area, identifying, for each of the one or more area scan data sets, a plurality of area feature scores corresponding to each of the plurality of predetermined height levels, identifying, based on the plurality of area feature scores, a plurality of area-wide feature scores corresponding to the plurality of predetermined height levels in the entire area, identifying a first predetermined height level among the plurality of predetermined height levels corresponding to a highest area-wide feature score among the plurality of area-wide feature scores, and generating a map of the entire area based on each scan data set of the plurality of scan data sets corresponding to the first predetermined height level.

20. The non-transitory computer-readable medium of claim 17, wherein an entire area comprises the one or more areas where the driving robot moves, and wherein the method further comprises:

identifying a height level among the plurality of predetermined height levels as a reference height level, and generating a map of the entire area based on scan data sets among the plurality of scan data sets corresponding to the reference height level identified in each of the one or more areas.

* * * * *